J. A. BISTLINE & J. P. JONES.
HAY RAKE.
APPLICATION FILED JUNE 3, 1913.
1,109,897.
Patented Sept. 8, 1914.
3 SHEETS—SHEET 1.
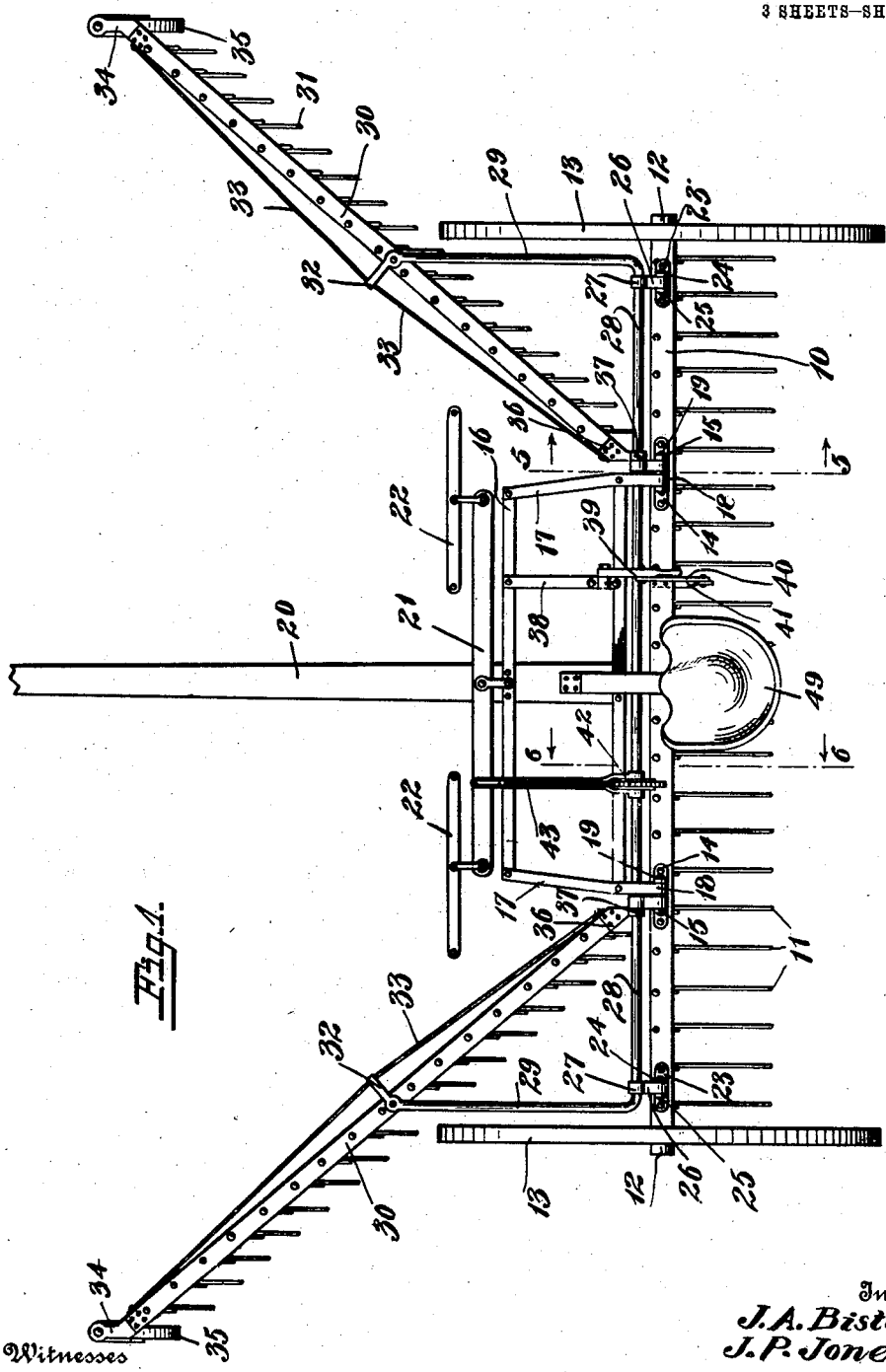
Fig.1.
Witnesses
Marshall Low
Harry M. Test
Inventors
J. A. Bistline
J. P. Jones
Attorneys J. A. BISTLINE & J. P. JONES.
HAY RAKE.
APPLICATION FILED JUNE 3, 1913.
1,109,897.
Patented Sept. 8, 1914.
3 SHEETS—SHEET 2.
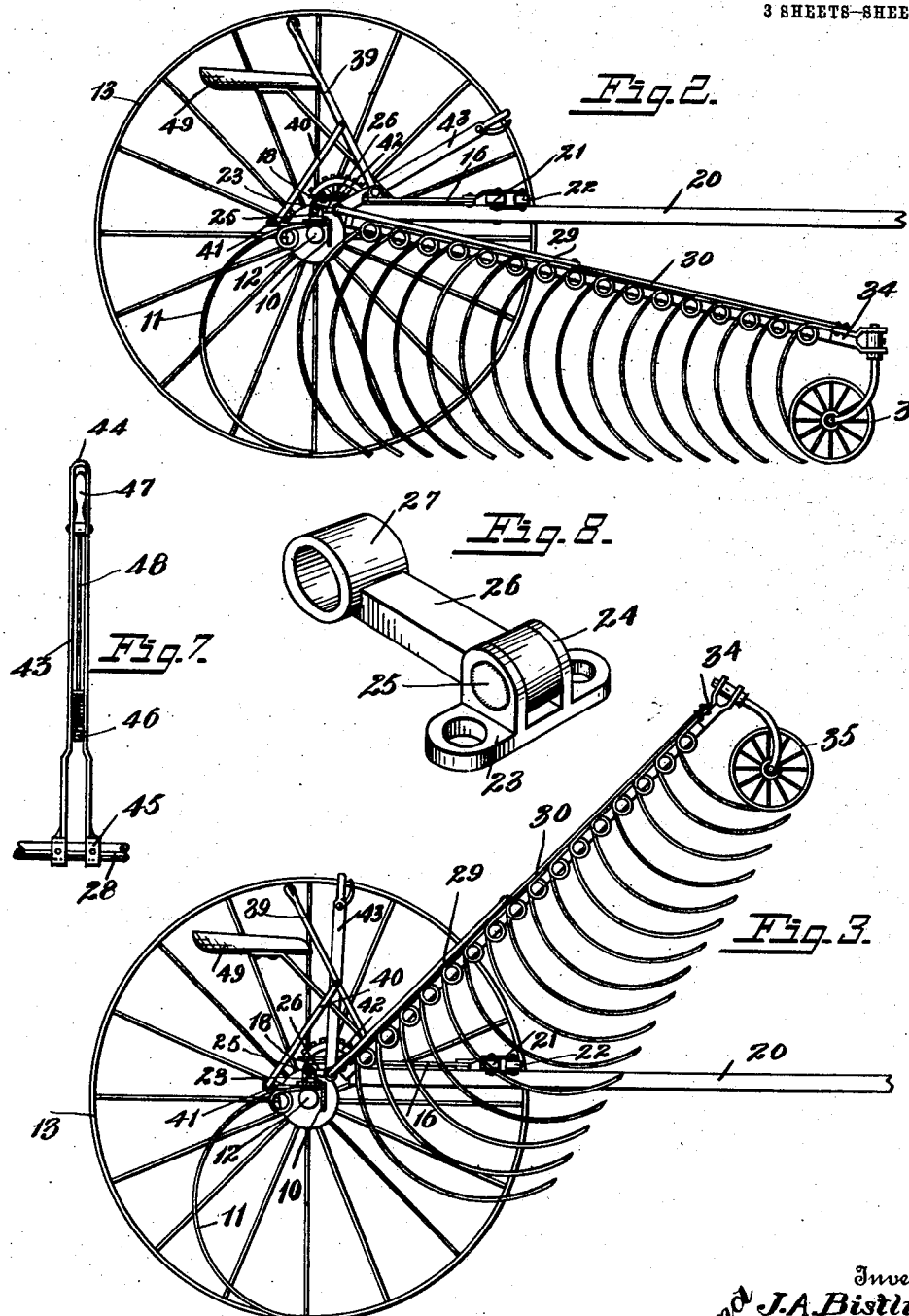
Witnesses
Marshall Low
Harry M. Test
Inventors
J. A. Bistline
and J. P. Jones
By 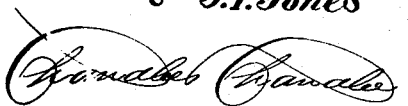
Attorneys

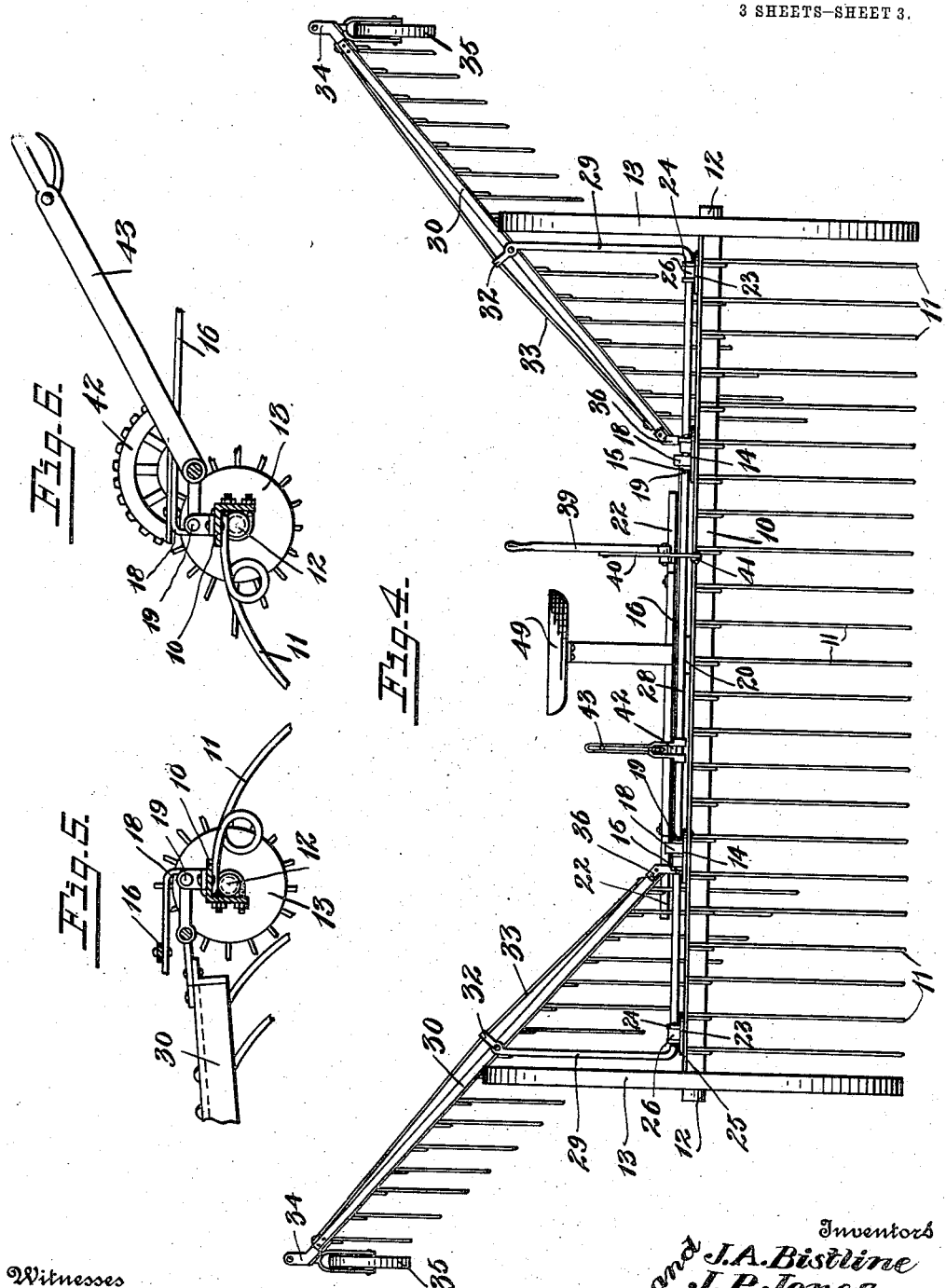

UNITED STATES PATENT OFFICE.

JOHN A. BISTLINE AND JOHN P. JONES, OF LOGAN, UTAH.

HAY-RAKE.

1,109,897.  Specification of Letters Patent.  Patented Sept. 8, 1914.

Application filed June 3, 1913. Serial No. 771,536.

*To all whom it may concern:*

Be it known that we, JOHN A. BISTLINE and JOHN P. JONES, citizens of the United States, residing at Logan, in the county of Cache, State of Utah, have invented certain new and useful Improvements in Hay-Rakes; and we do hereby declare the following to be a full, clear, and exact description of the invention, such as will enable others skilled in the art to which it appertains to make and use the same.

This invention relates to improvements in harvesting machines.

One object of the invention is to provide an efficient and durable machine of this character by means of which hay in the field can be windrowed, as well as cocked.

Other objects and advantages will be apparent from the following description when taken in connection with the accompanying drawings.

In the drawings: Figure 1 is a plan view of the machine in operative position. Fig. 2 is a side elevation of the same, one of the ground wheels being removed. Fig. 3 is a side elevation showing the gathering rakes in elevated position. Fig. 4 is a rear elevation of the machine showing the gathering rakes in elevated position. Fig. 5 is a vertical section on the line 5—5 of Fig. 1. Fig. 6 is a vertical section on the line 6—6 of Fig. 1. Fig. 7 is a detail view of the lifting lever for the gathering rakes, and Fig. 8 is a detail perspective view of the means for connecting the gathering rakes to the cocking rake.

Referring particularly to the accompanying drawings, 10 represents an angle bar to which are secured the tines 11 of the main rake of the device. In the ends of the bar 10 are the stub axles 12, 12 which carry the ground engaging supporting wheels 13. Secured on the bar 10 are the brackets 14, each of these brackets carrying a pair of upstanding parallel perforated lugs 15. Disposed in front of the bar 10 is a frame 16, the side members 17 of which extend rearwardly over the bar 10, as indicated at 18, and are pivotally mounted on bolts 19 carried by the brackets 14. Connected to this frame 16 is a draft tongue or pole 20, a doubletree 21 being pivoted thereto and carrying the swingletrees 22.

Near each end of the bar 10 and secured on the top thereof, are the brackets 23, each of these brackets carrying the pair of upstanding parallel lugs 24. These lugs carry the bolts or pivot pins 25 on which are pivotally mounted the links 26. The outer ends of these links have the apertured heads 27 which receive rotatably therein the round bar 28, this bar extending approximately the entire length of the bar 10, and in advance of the same a distance equal to the length of each of the links 26. On each end of the bar 28 is a forwardly extending arm 29, the forward end of each of said arms being rigidly connected to a forwardly extending and downwardly and outwardly inclined angle bar 30. Carried by this bar 30 are the rake teeth or tines 31, these tines being so positioned and lined as to extend in the same direction as the tines 11 of the main rake. Extending forwardly from the end of each of the arms 29 is a finger 32, this finger supporting the middle portion of a truss rod 33, the ends of which are secured to the ends of the bar 30. Secured to the outer end of each of the bars 30 is a casting 34, this casting carrying a caster wheel 35 for supporting the outer end of the bar 30. The inner end of each of the bars 30 has secured thereto a plate 36, this plate being provided with an apertured head 37 disposed on the bar 28, and secured thereto.

Pivotally mounted on one of the longitudinally extending members 38 of the frame 16 is a lever 39, this lever having a link 40 pivotally connected thereto at one of its ends and at its opposite end to an arm 41 rigidly secured to the bar 10 of the rear rake. By means of this lever 39, the rear rake can be raised and lowered to dump the hay as it is raked and to form rows or piles. Secured to the other longitudinal member 38 of the frame 16 is a rack segment 42, and straddling this segment and rigidly secured to the bar 28 is an operating lever 43. This lever is formed of a single strip of metal doubled on itself as at 44 and having its ends formed with the apertured heads 45 disposed on the bar 28 and secured thereto. Between the portions of the lever 43 is mounted a spring pressed pawl 46 which is operated by means of the hand-lever grip 47 pivoted between the portions of the lever near the upper end thereof, and connected to the pawl by means of the link 48. By means of the lever 43, the bar 28 may be rotated within the heads 27, to raise and lower the arms 29 for lifting and lowering the forwardly extending rake bars 30. It will be noted that the teeth of the forwardly extending rakes are graduated in size, the foremost one being smallest and gradually enlarging toward the rearmost. Secured to the tongue, within the boundary of the frame 16 is a seat 49.

In the operation of the device, the parts being in the position shown in Fig. 1, the machine is drawn by means of horses. The rakes 30 are spread at such an angle that they cover approximately three swaths of the hay cut by the mower, and by reason of the angle of extension of these rakes, the hay from the two side swaths is drawn inwardly and deposited on the middle swath. The rear rake gathers up the three swaths, and by means of the lever 39, this rear rake can be raised to dump the hay into the proper sized piles as the driver sees fit. By raising the rear rake, the side rakes will draw in the hay into windrows.

From the foregoing, it will readily be seen that when all of the rakes are in use, the hay can be cocked, and when the rear rake is thrown out of operation, the hay can be raked into windrows, thus producing a combined hay cocker and windrower. The peculiar arrangement of the pivotal connections between the frame 16 and the rear rake, and between the front rakes and the rear rake permits the front rakes and rear rake to be raised and lowered independently of each other and without disturbing either, or the frame 16.

What we claim is:

1. In a hay cocker and windrower, a wheel supported dumping rake, a frame pivotally carried by the rake, forwardly extending and downwardly and outwardly inclined gathering rakes, links pivotally mounted on the dumping rake, means rigidly carried by the gathering rakes and pivotally carried by the links, means for raising and lowering the dumping rake independently of the gathering rakes, and means for raising and lowering the gathering rakes independently of the dumping rake.

2. In a hay cocker and windrower, a main wheel supported dumping rake, a frame pivotally connected to the rake and provided with draft means, a bar pivotally mounted on the main rake and extending the length of the said rake, forwardly extending arms on the ends of the bar, forwardly extending and downwardly and outwardly inclined gathering rakes, said forwardly extending arms being rigidly connected to the gathering rakes, means for raising and lowering the dumping rake, and means for rocking the said bar to raise and lower the gathering rakes.

In testimony whereof, we affix our signatures, in the presence of two witnesses.

JOHN A. BISTLINE.
JOHN P. JONES.

Witnesses:
GEORGE D. CARDON,
KATIE CARDON.